United States Patent
Portas et al.

(10) Patent No.: US 9,613,735 B2
(45) Date of Patent: Apr. 4, 2017

(54) APPARATUSES FOR JOINING PAIRS OF ELECTRIC CABLES

(71) Applicants: Francesco Portas, Quattordio (IT); Ubaldo Vallauri, Monza (IT)

(72) Inventors: Francesco Portas, Quattordio (IT); Ubaldo Vallauri, Monza (IT)

(73) Assignee: PRYSMIAN CAVI E SISTEMI ENERGIA S.R.I. (IT)

( * ) Notice: Subject to any disclaimer, the term of this patent is extended or adjusted under 35 U.S.C. 154(b) by 377 days.

(21) Appl. No.: 14/022,920

(22) Filed: Sep. 10, 2013

(65) Prior Publication Data

US 2014/0007421 A1 Jan. 9, 2014

Related U.S. Application Data

(62) Division of application No. 12/083,623, filed as application No. PCT/IT2005/000609 on Oct. 19, 2005, now Pat. No. 8,555,499.

(51) Int. Cl.
*B23P 19/00* (2006.01)
*H01B 13/22* (2006.01)
(Continued)

(52) U.S. Cl.
CPC ............... *H01B 13/22* (2013.01); *H02G 1/14* (2013.01); *H02G 15/1826* (2013.01);
(Continued)

(58) Field of Classification Search
CPC .. G02B 6/4401; G02B 6/4444; H02G 15/013; H02G 15/076; H02G 15/113;
(Continued)

(56) References Cited

U.S. PATENT DOCUMENTS 3,783,487 A * 1/1974 May .............................. 29/753
3,946,480 A 3/1976 Dienes
(Continued)

FOREIGN PATENT DOCUMENTS

CA 2577179 A1 3/2006
EP 0149032 A2 7/1985
(Continued)

OTHER PUBLICATIONS

Office Action from the Canadian Intellectual Property Office dated Mar. 8, 2012, issued in corresponding Canadian Application No. 2,626,198.

*Primary Examiner* — Paul D Kim
(74) *Attorney, Agent, or Firm* — MH2 Technology Law Group LLP (57) ABSTRACT

An apparatus for applying an elastic tubular sleeve onto a splicing region between at least one pair of cables, wherein the tubular sleeve is supported in a radially expanded condition on at least one supporting element, may include axial-movement devices configured to axially move the at least one supporting element relative to the tubular sleeve at an adjustable speed, so as to cause a radial elastic shrinkage of the tubular sleeve capable of inducing an axial ejection thrust on the at least one supporting element, and counter devices configured to counteract the axial ejection thrust induced by the elastic shrinkage of the tubular sleeve.

30 Claims, 6 Drawing Sheets

(51) Int. Cl.
*H02G 1/14* (2006.01)
*H02G 15/18* (2006.01)

(52) U.S. Cl.
CPC .... *Y10T 29/49194* (2015.01); *Y10T 29/49195* (2015.01); *Y10T 29/49202* (2015.01); *Y10T 29/532* (2015.01); *Y10T 29/53243* (2015.01)

(58) Field of Classification Search
CPC .. H02G 15/117; H05K 5/068; Y10T 29/5171; Y10T 29/5176; Y10T 29/5177; Y10T 29/517; Y10T 29/5187; Y10T 29/53048; Y10T 29/53091; Y10T 29/5313; Y10T 29/53174; Y10T 29/53187; Y10T 29/53222; Y10T 29/53274; Y10T 29/53943; Y10T 29/53961
USPC ......... 29/52, 54, 56.6, 33 F, 33 K, 711, 721, 29/729, 739, 742, 748, 760, 762, 278; 174/17 CT, 50.5, 77 R, 135, 137 R, 174/152 G, 155, 156, 92, 93
See application file for complete search history.

(56) References Cited

U.S. PATENT DOCUMENTS

| | | | |
|---|---|---|---|
| 4,383,131 A | 5/1983 | Clabburn | |
| 4,503,105 A | 3/1985 | Tomioka | |
| 5,467,515 A | 11/1995 | Luzzi | |
| 5,486,388 A | 1/1996 | Portas et al. | |
| 5,492,740 A * | 2/1996 | Vallauri et al. | 428/34.9 |
| 5,495,650 A | 3/1996 | Crepel et al. | |
| 5,577,310 A | 11/1996 | Cheenne-Astorino et al. | |
| 5,801,332 A | 9/1998 | Berger et al. | |
| 5,844,170 A | 12/1998 | Chor et al. | |
| 6,171,669 B1 | 1/2001 | Vallauri et al. | |
| 6,472,600 B1 | 10/2002 | Osmani et al. | |
| 7,511,222 B2 | 3/2009 | Taylor et al. | |
| 7,767,909 B2 | 8/2010 | Krabs et al. | |
| 7,838,770 B2 | 11/2010 | Portas et al. | |
| 8,119,193 B2 | 2/2012 | Vallauri et al. | |
| 8,697,995 B2 * | 4/2014 | Vallauri et al. | 174/84 R |
| 8,789,570 B2 * | 7/2014 | Portas et al. | 156/423 |
| 8,943,686 B2 * | 2/2015 | Hartford et al. | 29/869 |
| 2004/0099434 A1 | 5/2004 | Balconi et al. | |

FOREIGN PATENT DOCUMENTS

| | | |
|---|---|---|
| EP | 0368235 A2 | 5/1990 |
| EP | 0 379 056 A2 | 7/1990 |
| EP | 0 393 495 A1 | 10/1990 |
| EP | 0 415 082 A1 | 3/1991 |
| EP | 0 422 567 A2 | 4/1991 |
| EP | 0 541 000 A1 | 5/1993 |
| EP | 0 547 656 A1 | 6/1993 |
| EP | 0 547 667 A1 | 6/1993 |
| EP | 0 735 639 A1 | 10/1996 |
| WO | WO 86/02210 A1 | 4/1986 |
| WO | WO-2006/029646 A2 | 3/2006 |

* cited by examiner

APPARATUSES FOR JOINING PAIRS OF ELECTRIC CABLES

CROSS-REFERENCE TO RELATED APPLICATION(S)

This application is a divisional of U.S. patent application Ser. No. 12/083,623, filed on Apr. 16, 2008, now U.S. Pat. No. 8,555,499, in the U.S. Patent and Trademark Office, the entire contents of which are incorporated herein by reference, and claims the associated benefit under 35 U.S.C. §§120 and 121. U.S. patent application Ser. No. 12/083,623 is a national stage entry from International Application No. PCT/IT2005/000609, filed on Oct. 19, 2005, in the Receiving Office of the Italian Patent and Trademark Office, the entire contents of which are additionally incorporated herein by reference, and claims the associated benefit under 35 U.S.C. §§120, 121, 363, and 365.

FIELD OF THE INVENTION

The present invention relates to a method for providing a splicing region between two electric cables for energy transport or distribution. More particularly, the present invention is concerned with a method for providing a splicing region between two electric cables for transport or distribution of high or ultra high-voltage energy.

The present invention also pertains to an apparatus for providing said splicing region.

In the present specification the term "medium voltage" is used with reference to a voltage typically included between about 1 kV and about 30 kV, while the term "high voltage" refers to a voltage higher than 30 kV. The term "ultra high voltage" is used to define a voltage exceeding about 150 kV or 220 kV, a voltage reaching 500 kV or even beyond this value for example.

The electric cables that are spliced according to the method of the present invention can be of the unipolar or multipolar type (bipolar or tripolar cables, for example) used for transmission or distribution of DC current or AC current.

The method and apparatus in accordance with the present invention can be applied to an electric or electro-optical connection being part of an electric and/or telecommunications network, as well as to a connection between an electric cable and an apparatus, e.g. a terminal.

STATE OR THE ART

Cables for energy transport or supply, in particular for transport or supply of medium- and high-voltage energy, generally comprise, starting from a radially internal position to a radially external position of the cable: a metal conductor, an inner semiconductive layer, an insulating layer, an outer semiconductive layer, a metal shield—usually made of aluminium, lead or copper—and an outer protective polymer sheath. The assembly consisting of the following constituent elements of the cable: metal conductor, inner semiconductive layer, insulating layer and outer semiconductive layer, is usually referred to as "cable core".

In order to splice two electric cables, of the unipolar type for example, the ends of the latter are previously treated so as to expose the constitutive elements of said cables over a portion of a predetermined length. Subsequently, the two cables are spliced forming an electric connection between the conductors of said cables, by welding for example, and then positioning a separately-produced splicing system close to the splicing region (i.e. the region where the conductors have been spliced).

The splicing system generally comprises a shrinkable tubular sleeve that, in turn, preferably comprises a plurality of radially superposed elements adapted to restore the mechanical and electric connection of the exposed layers of a first cable and a second cable to be submitted to splicing.

This shrinkable sleeve can be applied to the splicing region of two electric cables by previously radially expanding the sleeve and subsequently causing shrinkage of same on the cable by means of a heating action carried out on the sleeve itself (sleeve of the heat shrinkable type) or through removal of a supporting element of said sleeve, said supporting element being previously disposed so as to keep the sleeve in a radially expanded condition (sleeve of the cold shrinkable type).

Different methods of making splicing are known and they are described in documents EP-A-0 379 056; EP-A-0 393 495; EP-A-0 415 082; EP-A-0 199 742; EP-A-0 422 567 for example, in the name of the same Applicant.

Document U.S. Pat. No. 4,383,131 discloses a method of splicing a pair of electric cables by use of a tubular sleeve made of a heat-shrinkable material. The heat-shrinkable sleeve is disposed, in a radially expanded condition, around an end of one of said cables and subsequently an electric connection between the metal conductors of the cables themselves is carried out. Afterwards, the sleeve is axially centred on the splicing region and is shrunk around the splicing region through heat administration, in the form of a free flame for example. Installation of a sleeve of the heat-shrinkable type is therefore rather dangerous and difficult, and the necessity arises for qualified manpower.

As above mentioned, also known is use of a "cold shrinkable" sleeve that, under a condition of elastic expansion, is fitted on a removable hollow tubular supporting element made of a rigid plastic material. The sleeve thus supported is disposed around an end of one of the cables to be submitted to splicing and an electric connection is subsequently made between the metal conductors of said cables. Afterwards, the sleeve is coaxially centred on the splicing region and shrunk around said region by removal of the supporting element on which said sleeve is positioned in a radially expanded condition.

The above mentioned splicing devices are generally installed in a restricted space, such as trenches dug in the ground, which makes splicing operations particularly arduous, above all the operation for removal of the supporting element.

In addition, where the splicing operation concerns a pair of electric cables of the multipolar type (bipolar or tripolar cables, for example) the above described application procedure needs to be repeated for each stage of said cables. Consequently, removal of a corresponding number of supporting elements (two in the case of a bipolar cable, for example) is required, so that the splicing operation becomes still more arduous.

Removal of the supporting element from the respective cold-shrinkable sleeve can take place following different operating modes.

For instance, the surface of the tubular supporting element can be provided with a helical cut to obtain a plurality of adjacent coils of a ribbon-like element so that, by exerting a pulling force on a free end portion of said ribbon-like element, the tubular supporting element due to gradual separation of the coils, is moved away from the splicing region and the tubular sleeve carried by said support is caused to collapse and elastically shrink on said splicing region. Embodiments of the supporting elements are described in documents EP-A-0 541 000, EP-A-0 735 639, EP-A-0 547 656, EP-A-0 547 667 in the name of the same Applicant, for example.

Document U.S. Pat. No. 6,472,600 in the name of the same Applicant discloses a splicing system comprising: a tubular rigid supporting element formed of two supporting portions, a cold-shrinkable tubular sleeve previously expanded on said supporting element, and a connecting element to temporarily connect the two portions of said supporting element. In an embodiment described in this document, said connecting element comprises a pair of longitudinal braces connecting the outer end edges of said portions of the supporting element. The longitudinal braces retaining the two portions of the supporting element coaxially spliced are cut when the portions of the supporting element are to be ejected to enable shrinkage of the tubular sleeve at the splicing region. In addition, document U.S. Pat. No. 6,472,600 discloses use of an annular clamping brace disposed around one of the portions of the supporting element, so as to enable ejection of said portions during two distinct moments in succession. The portion of the supporting element retained by the annular brace, in effect, is ejected only after the annular brace is cut. After cutting of the annular brace, the thrust exerted by the elastic sleeve shrinking on the splicing region causes ejection of the corresponding portion of the supporting element. A shrinkable sleeve of this type is defined as "self-ejecting" because ejection of the portions of the supporting element begins as soon as said portions are no longer retained by any connecting element (longitudinal and annular braces). In compliance with this solution, once ejection has started it can no longer be controlled by the operator who is not able either to slow down or to speed up the operation of ejecting said portions of the supporting element.

In addition, in accordance with a further embodiment described in document U.S. Pat. No. 6,472,600 B1, the two portions of the supporting element may include a frusto-conical portion the slightly tapering shape of which allows easy ejection of the portions themselves, once they are disengaged from the connecting elements, as a result of the thrust exerted by the sleeve submitted to elastic shrinkage. In accordance with this document, the self-ejecting operation of the portions of the supporting element is further promoted by the presence of a lubricating material applied between the supporting element and the elastic tubular sleeve. Preferably, said lubricating material is a grease capable of staying in situ, which therefore does not flow by effect of the pressure exerted by the elastic tubular sleeve when said sleeve shrinks on the splicing region.

Document EP-A-0 149 032 in the name of the same Applicant discloses a device in which removal of the supporting element from the elastic sleeve carried out with the aid of a tool comprising a first plate-like abutment element provided with a through opening passed through by an end portion of the supporting element axially projecting from the elastic sleeve. The first abutment element acts against a shoulder set on the end of the supporting element. A pair of further abutment elements of a plate-like shape and also provided with a through opening are arranged around the supporting element in axial abutment relationship against respective shoulders present on the elastic sleeve.

The abutment elements are passed through by threaded bars in register with threaded bushes engaged through respective through holes. The threaded bushes are adapted to be driven in rotation to cause mutual spacing apart between the abutment elements acting against the supporting element and against the elastic tubular sleeve respectively, so as to control removal of the supporting element and obtain elastic shrinkage of the tubular sleeve.

Document EP-A-0 368 235 in the name of the same Applicant discloses a device in which removal of the supporting element from the elastic tubular sleeve is carried out with the aid of an apparatus comprising a first abutment element to be engaged around the supporting element to act in abutment against an axial shoulder of the elastic sleeve, a second abutment element set to removably engage the tubular support, and a drive unit acting on the abutment elements to move them mutually away so as to pull the supporting element out of the tubular sleeve. The drive unit comprises a tubular guide element having one end secured to the second abutment element, and rotatably housing a threaded bar operatively in engagement with a block rigidly connected to the first abutment element. The threaded bar is drivable in rotation through a knob disposed externally of the tubular supporting element so as to move the abutment elements away from each other to cause removal of the supporting element from the elastic sleeve. To maintain a coaxial alignment between the cable and the supporting element, the first abutment element comprises a plurality of dowels radially inserted through respective apertures formed in the supporting element, and slidably acting against the outer surface of the cable so as to prevent the end of the supporting element, during the removal step, from cutting and/or damaging the outer surface of the cable itself.

The Applicant noticed that removal of the supporting element of a tubular elastic sleeve in accordance with the known art can give rise to an undesirable formation of air pockets that can be entrapped between the spliced cables and the elastic sleeve during radial shrinkage of the sleeve on the cables.

Formation of air pockets at the splicing region is particularly dangerous because it can promote formation of partial discharges during use of the cables thus spliced and said partial discharges can damage the cables in an irreversible manner. This phenomenon is still more marked where cables for transport and/or distribution of high-voltage energy are concerned.

In more detail, in compliance with the splicing methods known in the art and involving use of cold-shrinkable sleeves, the Applicant could ascertain that starting of the radial shrinkage of the elastic tubular sleeve gives rise to starting of the step of ejecting the supporting element from the splicing region, said ejection being caused by the axial thrust exercised by the elastic sleeve during radial shrinkage of same on the cable. Ejection of the supporting element therefore takes place in an uncontrolled manner, i.e. without any control system and/or any system for modifying the ejection speed of the supporting element being arranged.

In addition, the Applicant realised that, should use of a lubricant be provided between the elastic sleeve and the supporting element in order to facilitate the ejecting operation, an uncontrolled speed in ejecting the supporting element can cause formation of stored lubricant at the interface between the tubular sleeve and the underlying spliced cables, which will involve an unacceptable quality decay of the splicing region. In particular, this phenomenon can give rise to a reduction in the electrical properties at the interface between the tubular sleeve and the cables, because the stored lubricant generally incorporates air bubbles that, as above said, can cause formation of partial discharges.

SUMMARY OF THE INVENTION

The Applicant has perceived that the above mentioned formation of undesired air bubbles generally takes place when ejection of the supporting element does not gradually follow shrinkage of the elastic tubular sleeve, which event can cause an uneven shrinkage of the sleeve itself. For instance, when the supporting element is already completing the ejection step while the elastic tubular sleeve due to the elastic behaviour of the material of which it is made, is still collapsing at the splicing region of the underlying spliced cables, it may happen that a sleeve portion axially close to the supporting element (or to a portion of said support) under ejection collapses on the cable before collapsing occurs of a sleeve portion at a farther position with respect to the supporting element itself. Under this situation, collapsing of the elastic tubular sleeve does not take place in an even and gradual manner for axially consecutive portions of the sleeve itself. Consequently, air may be entrapped between the tubular sleeve and the underlying spliced cables causing formation of the above mentioned air pockets.

In order to overcome the above mentioned drawbacks, the Applicant has found that it is necessary to adapt the ejection speed of the support or of portions thereof if the supporting element is made of two axially adjacent distinct halves, to the true shrinkage speed of the elastic tubular sleeve, said shrinkage speed (i.e. the collapsing speed of the sleeve on the splicing region) being correlated with the recovery speed of the elastic material of which the tubular sleeve is made.

Since the tubular sleeve is formed of a plurality of elements some of which made of materials different from each other and having different recovery speeds, the shrinkage speed of the sleeve substantially corresponds to the shrinkage speed of the sleeve element having a lower recovery speed.

In more detail, the Applicant has found that it is necessary to adjust the ejection speed of the supporting element so that said speed can be correlated with the recovery speed of the elastic material forming the tubular sleeve.

Therefore, in one aspect, the present invention relates to a method of splicing at least one pair of cables, each cable including at least one conductor, said method comprising the steps of: setting a elastic tubular sleeve supported in a radially expanded condition on at least one supporting element; disposing the sleeve, in engagement with said supporting element, in a substantially coaxial position around one of said cables; connecting each conductor of said at least one pair of cables to obtain a splicing region between these cables; positioning the sleeve in engagement with the supporting element around the splicing region; axially moving the supporting element relative to the tubular sleeve, so as to cause a radial elastic shrinkage of the tubular sleeve capable of inducing an axial ejection thrust on the supporting element itself; counteracting the axial ejection thrust induced by the elastic shrinkage of the tubular sleeve; and adjusting the axial movement speed of the supporting element so as to adapt it to the elastic shrinkage speed of the tubular sleeve.

By the method in accordance with the present invention it is possible to take into account possible variations suffered by the sleeve material as regards its resilience, for example during the storage period preceding the step of installing the sleeve itself. These variations in the sleeve resilience can take place either following a particularly extended storage period or following the occurrence of particular environmental conditions during said period or also at any moment preceding installation of the sleeve, which factors can modify the elastic recovery of the material of which the sleeve is made, even to a great extent.

In addition, the method of the present invention is particularly advantageous because it is not affected by the environmental temperature present at the moment of the installation. In fact, an important lowering of the environmental temperature (above all when said temperature goes down under about 10° C.) causes a reduction often of great amount, in the shrinkage speed of the tubular sleeve relative to the ejection speed of the support, this fact involving a greater risk as regards formation of the above mentioned air pockets.

Furthermore, the method in accordance with the present invention enables the risks of jamming or locking of the supporting element during axial sliding of the latter to be avoided or at least greatly reduced, above all in the starting ejection step, in the absence of axial forces imposing a correct sliding to the supporting element within the elastic tubular sleeve. In fact, since the method of the present invention allows a precise and uniform control of the ejection speed of the supporting element, a possible jamming during the elastic shrinkage step of the tubular sleeve is advantageously averted.

In addition, by the method of the present invention use of lubricating materials that are usually placed at the interface between the elastic tubular sleeve and the supporting element to promote ejection of said supporting element is reduced. As above said, said lubricating materials can give rise to contact irregularities at the sleeve/spliced cables interface and/or promote entrapping of air particles between the inner surface of the elastic sleeve and the underlying cables. Furthermore, where the sleeves are submitted to long storage periods, said lubricating materials can gradually escape from the sleeve and/or be submitted to qualitative decay and, as a result, to a partial loss of their lubricating function. Since the method of the present invention allows the ejection speed of the supporting element to be adjusted so as to adapt it to the elastic shrinkage speed of the tubular sleeve, the amount of lubricating material can be advantageously reduced as compared with the self-ejecting systems of the known art. In fact, in a self-ejecting system use of a rather high amount of lubricating material is convenient, which material is interposed between the supporting element and the tubular sleeve, for the purpose of ensuring a full implementation of said ejection. In compliance with the present invention, on the contrary, it is sufficient to ensure the only amount of lubricating material that is strictly indispensable to avoid friction between the supporting element and the sleeve being so strong that the sleeve itself is deteriorated, as the ejection action does not rely on the lubricating material but on the axial movement of the supporting element relative to the sleeve, which movement is directly controlled from the outside.

The method of the present invention enables the above mentioned drawbacks to be overcome due to adjustment of the ejection speed of the supporting element relative to the shrinkage speed of the sleeve on the underlying spliced cables. In particular, the method of the present invention comprises the step of driving ejection of the supporting element by application of a pulling force oriented in an axial direction and applied to at least one end of the supporting element projecting externally of the elastic tubular sleeve. In this way, the method of the present invention enables a correct ejection of the supporting element to be ensured in a substantial absence of jamming actions both in the starting ejection step and during separation from the elastic tubular sleeve, which jamming actions are caused by friction generated by the sleeve elastically expanded on the supporting element.

In a further aspect, the present invention relates to an apparatus for applying a elastic tubular sleeve onto a splicing region between at least one pair of cables, in which said elastic tubular sleeve is supported in a radially expanded condition on a supporting element, said apparatus comprising: axial movement devices to axially move the supporting element relative to the tubular sleeve at an adjustable speed, so as to cause a radial elastic shrinkage of the tubular sleeve capable of inducing an axial ejection thrust on the supporting element itself; counter devices to counteract the axial ejection thrust induced by the elastic shrinkage of the tubular sleeve.

It is a further object of the invention to provide an apparatus for splicing at least one pair of cables, each cable including at least one conductor, said apparatus comprising: a removable supporting element; a elastic tubular sleeve supported in a radially expanded condition on the removable supporting element; axial movement devices susceptible of operatively engaging the tubular sleeve and the supporting element to axially move at least one portion of the supporting element relative to the tubular sleeve at an adjustable speed, so as to give rise to a radial elastic shrinkage of the tubular sleeve that is capable of inducing an axial ejection thrust on the supporting element itself; counter devices to counteract said axial ejection thrust induced by the elastic shrinkage of the tubular sleeve.

Further features and advantages will become more apparent from the detailed description of a preferred but not exclusive embodiment of a method and an apparatus for splicing a pair of electric cables, in accordance with the present invention.

BRIEF DESCRIPTION OF THE DRAWINGS

Such a description will be set out hereinafter with reference to the accompanying drawings, given by way of non-limiting example, in which.

DETAILED DESCRIPTION OF THE PREFERRED EMBODIMENT

With reference to the drawings, an apparatus to splice at least one pair of cables in accordance with the present invention has been generally identified by reference numeral 1.

In the course of the present description and in the accompanying drawings, reference will be made by way of example to the splicing between two electric high-voltage cables 2a, 2b. It is however to be pointed out that the invention can be also applied to electric connections being part of an electric and/or telecommunications network, as well as to any electric connection between one cable and one terminal of an electric apparatus.

In addition, the constituent elements of the splicing between cables 2a, 2b will not be described in detail because they can be made in a conventional manner known by itself.

Apparatus 1 lends itself to be used in creating a splicing between at least one pair of cables 2a, 2b each comprising at least one conductor 3a, 3b externally coated with a polymer sheath 4a, 4b the function of which is to carry out a mechanical and/or electric-insulation protection of the conductor 3a, 3b with respect to the external environment. Generally interposed between the external polymer sheath 4a, 4b and the conductor 3a, 3b (see in particular FIG. 6) are the following elements: an outer semiconductive layer 5, an insulating layer 6, and an inner semiconductive layer (not shown) that is interposed between the conductor 3a, 3b and the insulating layer 6.

Cables 2a, 2b are prepared by partial removal of the outer polymer sheath 4a, 4b, the insulating layer 6, 7 and the outer semiconductive layer 5, so that each of said cable components axially projects over a section of the desired length relative to the component superposed thereon. In order to carry out a splicing operation, it is essentially contemplated that the conductors 3a, 3b of cables 2a, 2b be mutually interconnected in axial continuation relationship, by welding for example, in order to restore the electric continuity between said conductors 3a, 3b. Subsequently applied onto the splicing region is a elastic tubular sleeve 8 the function of which is to cover the inner components of the cables 2a, 2b that are exposed in the splicing region, and to restore the electric and mechanical continuity between the polymer sheaths 4a, 4b, insulating layers 6, 7 and semiconductive layers 5.

Figure 6:
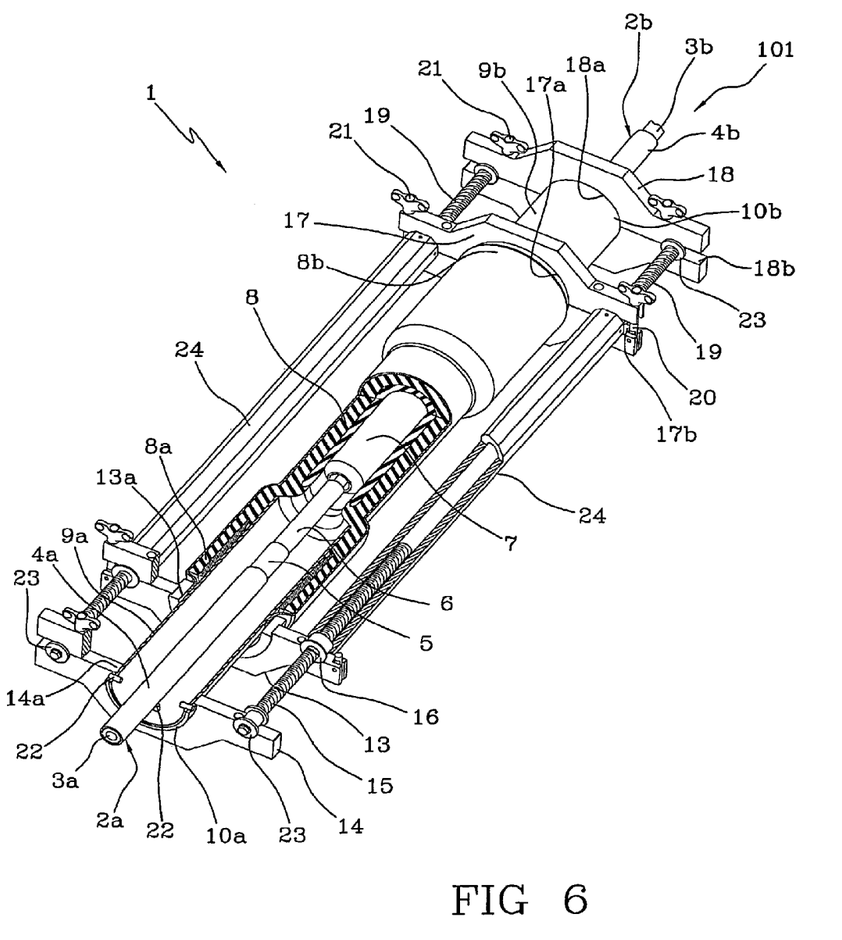
FIG. 6 is a perspective split view of an alternative embodiment of the apparatus of the invention.
Figure 7:
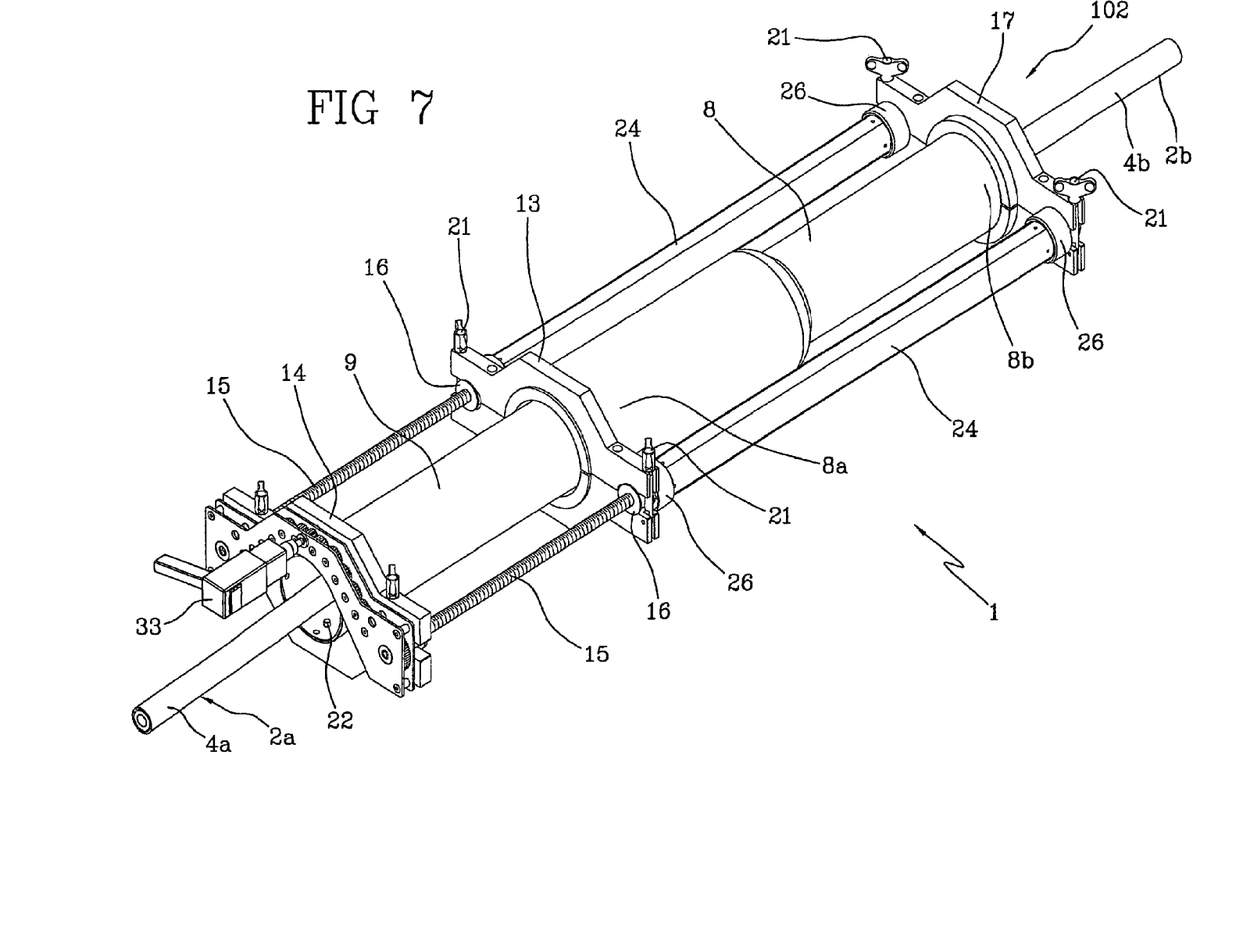
FIG. 7 shows a further alternative embodiment of the apparatus of the present invention.

In more detail, the elastic tubular sleeve 8 is set in a radially expanded condition on at least one tubular supporting element 9, preferably of plastic material, that can be made of two axially consecutive halves 9a, 9b for example, as provided in the examples in FIGS. 1 to 6, or in a unitary form as shown in the example in FIG. 7. In both cases the supporting element 9 has a first and a second ends 10a, 10b axially projecting from a first and a second ends 8a, 8b of the tubular sleeve 8, respectively.

The elastic tubular sleeve 8 engaged by the supporting element 9 is fitted in a substantially coaxial position on one of the cables 2a, 2b before carrying out connection between the conductors 3a, 3b of same. Once connection between the conductors 3a, 3b to obtain the desired splicing has been carried out, the sleeve 8 is disposed in, an axially centred position around the splicing region, to be subsequently applied thereto, following removal of the supporting element 9 and the consequent elastic shrinkage of the sleeve itself on the splicing region.

Axial movement of the supporting element 9 relative to the tubular sleeve 8 for application of the latter to the splicing region is advantageously carried out by an apparatus generally denoted at 100 in FIGS. 1 to 5, at 101 in FIG. 6 and at 102 in FIG. 7. Integrated into the apparatus 100, 101, 102 are axial-movement devices 11 to be operatively in engagement with the tubular sleeve and the supporting element 9 to axially move the supporting element 9 or at least one of the halves 9a, 9b of same relative to the tubular sleeve 8 at an adjustable speed. In other words, the supporting element 9 is axially pulled out of the tubular sleeve 8 that, as a result, elastically shrinks and exerts a radial tightening action against cables 2a, 2b in the splicing region of the latter. The radial elastic shrinkage of the tubular sleeve 8 induces an axial ejection thrust on the supporting element 9. In the absence of any control, once this axial ejection thrust has been triggered, it would tend to eject the supporting element 9 from the tubular sleeve 8 in a self-governing manner. In accordance with the present invention, advantageously associated with the apparatus 100, 101, 102 are counter devices 12 counteracting said axial ejection thrust so as to eliminate the risk of the supporting element 9 being ejected in an uncontrolled manner from the tubular sleeve 8.

In more detail, the axial-movement devices 11 comprise at least one first fixed abutment 13 susceptible of engagement with the tubular sleeve 8, preferably at a first end 8a of the latter, and at least one first movable abutment 14 susceptible of engagement with the supporting element 9 at the first end 10a of same that is close to the first end 8a of the sleeve. Connected to one of said first fixed abutment 13 and first movable abutment 14, preferably to the movable abutment 14, is a first co-operating threaded bar 15 screwed in a first nut screw 16 carried by the other of said first fixed abutment 13 and first movable abutment 14. In more detail, at least one pair of first threaded bars 15 and one pair of respective first nut screws 16 is provided and they are disposed at diametrically opposite positions relative to the tubular sleeve 8. Following a relative rotation between each of the first threaded bars 15 and the corresponding first nut screw 16, moving away from each other between the first fixed abutment 13 and the first movable abutment 14 occurs. Consequently, axial movement of the supporting element 9 is obtained by effect of a pulling action applied to the first end 10a of said supporting element 9, concurrently with a corresponding counter action exerted by the first fixed abutment 13 on the first end 8a of the tubular sleeve 8.

In the examples shown in FIGS. 1 to 5 and 6, where the supporting element 9 is divided into two distinct portions 9a, 9b that are disposed in axial side by side relationship, the axial-movement devices further comprise at least one second fixed abutment 17 acting on the second end 8b of the tubular sleeve 8, in an axially opposite position relative to the first fixed abutment 13, and at least one second movable abutment 18 for engagement with the second end 10b of the supporting element 9 at an axially opposite position relative to the first movable abutment 14. At least one second threaded bar 19, and more specifically one pair of diametrically-opposite second threaded bars 19, is engaged and axially secured relative to one of the second fixed 17 and second movable 18 abutments, preferably the second movable abutment 18, and co-operates by screwing with a pair of second nut screws 20 carried by the other of said second fixed 17 and second movable 18 abutments. In the same manner as previously said with reference to the first threaded bars 15, the relative rotation between the second threaded bars 19 and the respective second nut screws 20 causes an axial movement of the second movable abutment 18 relative to the second fixed abutment 17 and, as a result, an axial movement of the second portion 9b of the supporting element 9 relative to the tubular sleeve 8.

The counter devices 12 essentially comprise at least one tie-rod 24, more preferably at least one pair of tie-rods 24, extending between the first fixed abutment 13 and the second fixed abutment 17 at diametrically opposite positions relative to sleeve 8. In accordance with the embodiment shown in FIG. 6, moving away of the first fixed abutment 13 and the first movable abutment 14 from each other as well as moving away between the second fixed abutment 17 and the second movable abutment 18 is carried out by driving the tie-rods 24 in rotation. In detail, rotation of the tie-rods 24, with which the nut screws 16, 20 are integral, causes an axial movement of the threaded bars 15, 19 and, consequently, moving away of the above mentioned fixed and movable abutments from each other.

The tie-rods 24 at least partly accommodate each of the first and/or second threaded bars 15, 19, extending longitudinally within the tie-rods 24 themselves.

Advantageously, the tie-rods 24 lend themselves to transmit an axial reaction force opposing to said axial ejection thrust, to the first end 10a of the supporting element 9 through the first threaded bars 15 and the first movable abutment 14, concurrently with exerting a corresponding counter reaction force on the second end 8b of the tubular sleeve 8 through the second fixed abutment 17.

Preferably, each of said first fixed abutment 13, first movable abutment 14, second fixed abutment 17 and second movable abutment 18, or at least one of them, has a plate-like conformation with a through central opening 13a, 14a, 17a, 18a of a smaller diameter than the outer diameter of the elastic tubular sleeve 8 to be positioned around the supporting element 9. Each of said first fixed abutment 13, first movable abutment 14, second fixed abutment 17 and second movable abutment 18, or at least one of them, further has at least one and preferably two engagement seats 13b, 14b, 17b, 18b each of which can be operatively coupled with the respective first and second threaded bars. As clearly viewed from the accompanying drawings, each of said first fixed abutment 13, first movable abutment 14, second fixed abutment 17 and second movable abutment 18 is preferably formed with a pair of half-plates adapted to be coupled in a coplanar relationship along a splicing line extending through the central opening 13a, 14a, 17a, 18a and the engagement seats 13b, 14b, 17b, 18b. Threaded connecting members 21 allow the half-plates belonging to each of the abutments 13, 14, 17, 18 to be removably coupled with each other.

Figure 1:
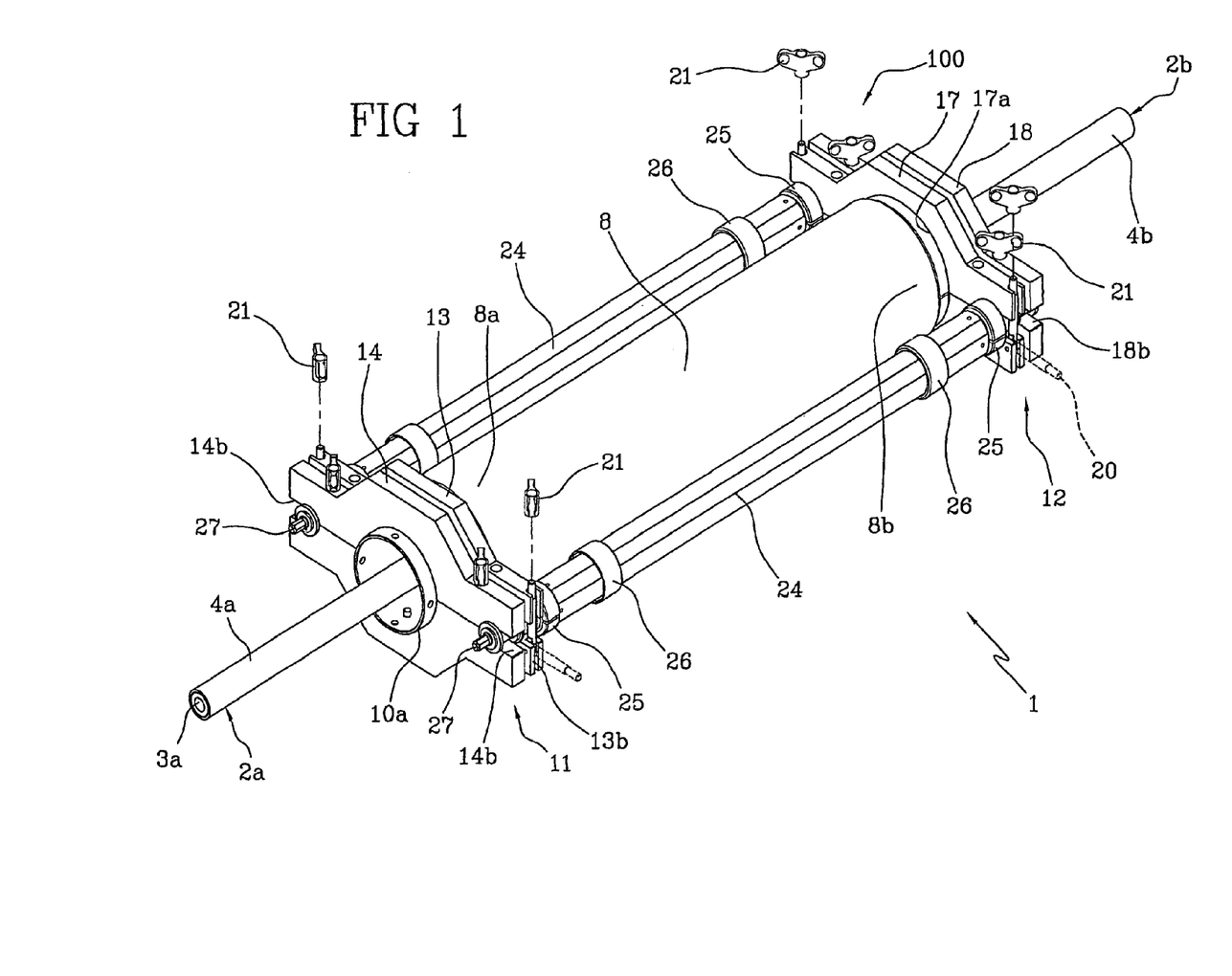
FIG. 1 is a perspective view of an apparatus in accordance with the present invention for application of a elastic tubular sleeve close to a splicing region between one pair of cables.
Figure 2:
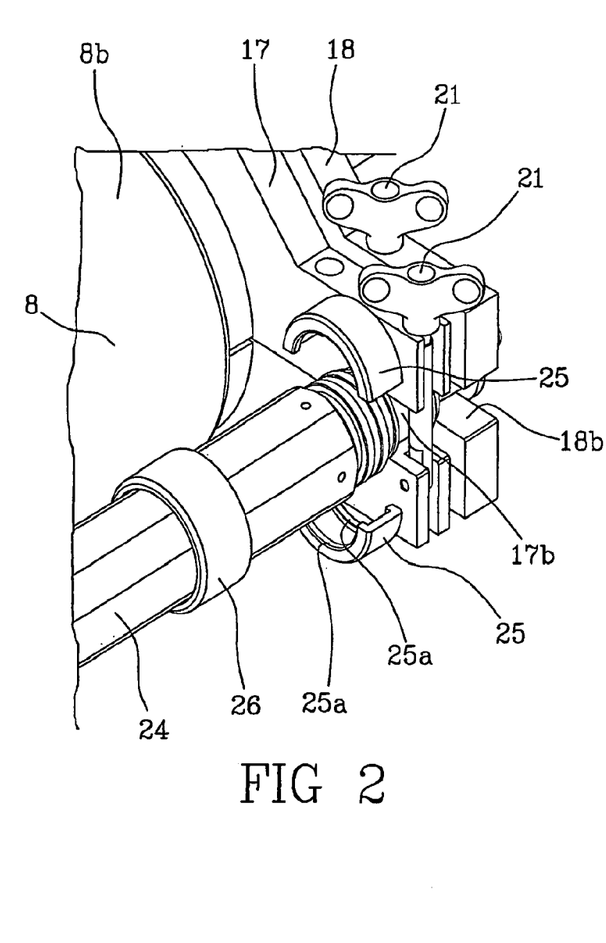
FIG. 2 shows an enlarged detail of the apparatus of the invention, in an installation step following that seen in FIG. 1.
Figure 3:
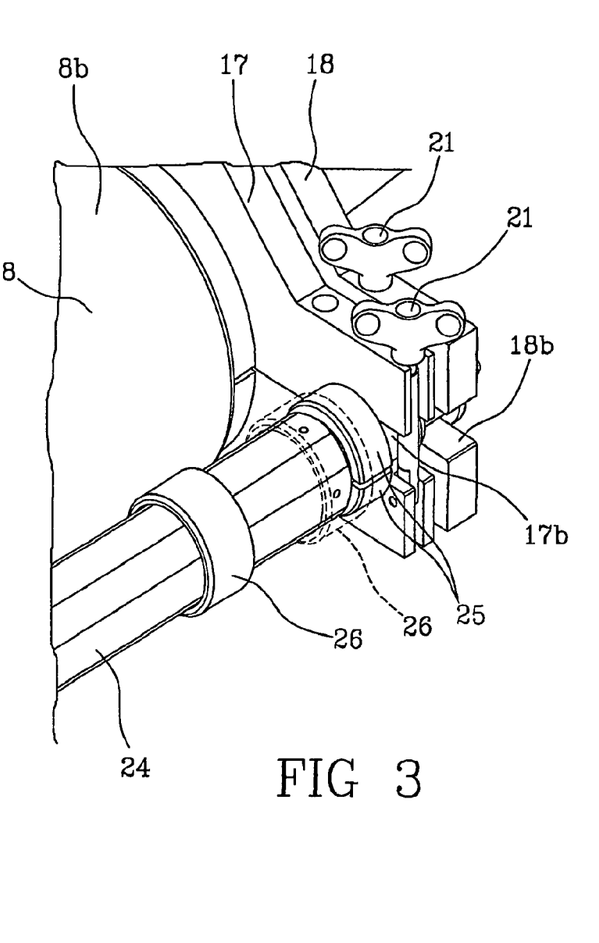
FIG. 3 shows an enlarged detail of the apparatus of the invention, in an installation step following that seen in FIG. 2.
Figure 4:
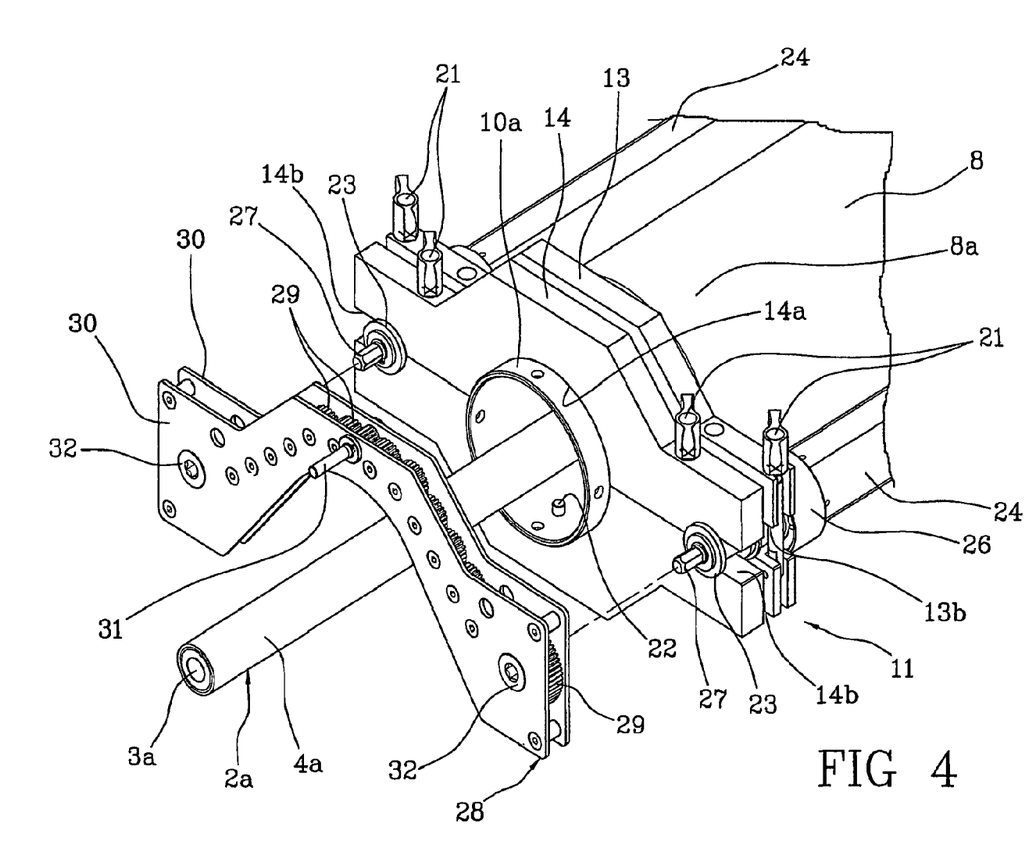
FIG. 4 shows an enlarged detail of the apparatus of the invention in a further subsequent installation step of the apparatus itself.
Figure 5:
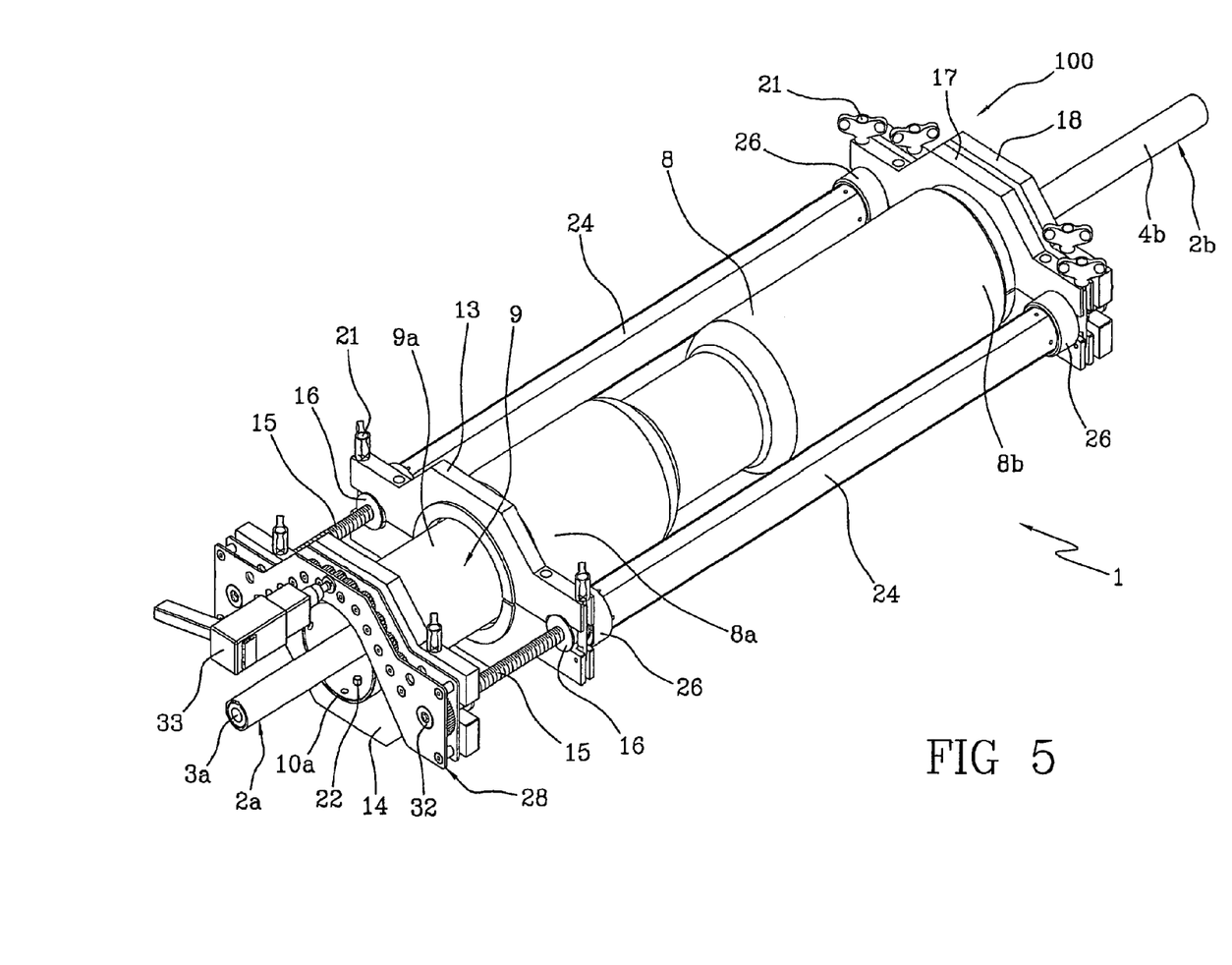
FIG. 5 shows a step of use of the apparatus seen in the preceding figures.

Engagement between each of said first and second movable abutment elements 14, 18 and the supporting element 9 can be carried out with the aid of one or more radial pins 22 projecting from the central opening for engagement into corresponding seats arranged in the first and second ends 10a, 10b of the supporting element 9, as shown in FIGS. 4 and 6.

Engagement between the first and second threaded bars 15, 19 and the respective engagement seats 14b, 18b disposed in the first and second movable abutments 14, 18 can take place through bushes 23 carried at one end of each of the threaded bars themselves, and suitable for engagement in an axially locked relationship into the respective engagement seats 14b 18b.

In the embodiment shown in FIG. 6 where, as better clarified in the following, axial movement of the portions 9a, 9b of the supporting element 9 takes place by driving the tie-rods 24 in rotation, the screw nuts 16, 20 (integral with said tie-rods) are axially fastened into the respective engagement seats 13b, 17a but are free to rotate within the same so as to cause an axial movement of the threaded bars 15, 19.

In accordance with the embodiment shown in FIG. 6, the two distinct portions 9a, 9b of the supporting element 9 are simultaneously moved in an axial direction.

Alternatively, in compliance with the embodiments shown in FIGS. 1 to 5, the two distinct portions 9a, 9b of the supporting element 9 can be axially moved simultaneously or distinctly, so as to cause ejection of one of said portions at one moment and subsequent ejection of the other portion.

In the embodiments shown in FIGS. 1 to 6, the elastic shrinkage of the tubular sleeve 8 tends to eject the first and second portions 9a, 9b of the supporting element 9 in respectively opposite directions. Ejection of the first portion 9*a* of the supporting element 9 is counteracted by the axial reaction force transmitted to the first end 10*a* of the supporting element 9, through the first threaded bars 15, concurrently with a corresponding counter reaction transmitted to the second end 8*b* of the tubular sleeve 8 through the tie-rods 24 and the second fixed abutment 17. Likewise, ejection of the second portion 9*b* of the supporting element 9 is counteracted by the reaction transmitted to the second end 10*b* of the supporting element itself, through the second threaded bars 19 concurrently with a corresponding counter reaction transmitted by the tie-rods 24 and the first fixed abutment 13 to the first end 8*a* of the tubular sleeve 8.

The first and/or second nut screws 16, 20 can be integrally carried by the respective ends of the tie-rods 24, as provided in FIG. 6, or they can be removably secured to the tie-rods 24 by means of axial locking bushes 25. As better shown in FIGS. 2 and 3, each axial locking bush 25 preferably comprises two circumferential ridges 25*a* to be engaged into respective circumferential grooves formed in the nut screw 16, 20 and in the corresponding end of the tie-rod 24, respectively. In more detail, each axial locking bush 25 can advantageously comprise a pair of shell halves to be coupled at diametrically opposite sides, and a holding ring nut 26 disposed around the tie rod 24 and adapted to be fitted by axial sliding around the shell halves coupled together to form the bush 25.

In accordance with the embodiments shown in FIGS. 1 to 5 and 7, the axial-movement devices 11 advantageously comprise at least one drive 27 carried by at least one of the first and/or second threaded bars 15, 19 or, alternatively, by at least one of the first and/or second nut screws 16, 20 in order to cause mutual rotation of same to obtain axial movement of the supporting element 9.

In the embodiments shown in FIGS. 1 to 5 and 7, this drive 27 is associated with each of the threaded bars 15, 19, the nut screws 16, 20 being restrained from rotating and axially moving relative to the fixed abutments 13, 17. The drives 27 are adapted to be directly set in rotation with the aid of manual tools or by at least one motor, to carry out a relative rotation between the threaded bars 15, 19 and the nut screws 16, 20. In detail, the drives 27 impart a rotation movement to the threaded bars 15, 19, said bars, through the nut screws 16, 20 integral with the tie-rods 24 at least axially, causing axial movement either of the portions 9*a*, 9*b* of the supporting element (FIGS. 1-5) or of the unitary supporting element (FIG. 7).

In a preferred embodiment, the axial-movement devices comprise at least one kinematic driving unit 28 adapted to be operatively coupled with each pair of the first and second threaded bars 15, 19 so that rotation of the bars belonging to each pair is carried out in a simultaneous and synchronised manner. To this aim, the kinematic driving unit 28 comprises a plurality of cogwheels 29 rotatably in engagement between two holding plates 30 to substantially define a double gear cascade operatively interposed between a primary drive 31 and a pair of driving bushes 32 to be operatively coupled with the drives 27 carried by the first and/or second threaded bars 19. The primary drive 31 is adapted to be operatively coupled with a motor, integrated into a common drill 3 or other manual power tool for example, to obtain simultaneous operation of the first and/or second threaded bars 15, 19.

The apparatus 100, 101, 102 lends itself to be associated with the elastic tubular sleeve 8 set on the supporting element 9, before the latter (i.e. sleeve 8 fitted on support 9) are fitted on one of the electric cables 2*a*, 2*b* to be submitted to splicing. To this aim, the half-plates constituting each of the fixed abutments 13, 17 and movable abutments 14, 18 are mutually coupled around the respective first and second ends 10*a*, 10*b* of the supporting element 9 axially projecting from the tubular sleeve 8. The first threaded bars 15 and second threaded bars 19, if any, together with the respective nut screws 16, 20 and tie-rods 24, are connected to the engagement seats 13*b*, 14*b*, 17*b*, 18*b* defined between the half-plates of the fixed 13, 17 and movable 14, 18 abutments.

At the end of this operation, the first movable abutment 14 and second movable abutment 18, if any, will be in engagement with the respective ends 10*a*, 10*b* of the supporting element 9, while the first and second fixed abutments 13, 17 are set to act in abutment against the respective ends 8*a*, 8*b* of sleeve 8 and are mutually interconnected by the tie-rods 24.

At this point, the assembly formed of the tubular sleeve 8 disposed on the supporting element 9 together with the apparatus 100, 101, 102 associated therewith, is adapted to be fitted on one of cables 2*a*, 2*b* to carry out the splicing operations. When splicing has been completed, the sleeve 8 secured on the supporting element 9 together with the apparatus 100, 101, 102 is disposed at a centred position on the splicing region. The apparatus 100, 101, 102 lends itself to be used for carrying out removal of the supporting element 9 from sleeve 8.

In the different embodiments described with reference to FIGS. 1 to 6 and 7 respectively, removal of the sleeve 8 takes place following different modes.

With reference to the embodiment depicted in FIGS. 1 to 6 respectively, removal of the supporting element 9 is obtained by axially pulling the first and second halves 9*a*, 9*b* of the supporting element 9 out of the tubular sleeve 8, following opposite directions.

In more detail, in the example described with reference to FIGS. 1 to 5 the kinematic driving unit 28 is first installed close to the first movable abutment 14, the driving bushes 28 being brought into engagement with the drives 27 of the respective first treaded bars 15. With the aid of a manual tool or preferably an electric drill 33, the primary drive 31 is set in rotation. The rotary motion is transmitted to the first threaded bars 15 that are simultaneously operated causing the first movable abutment 14 to move away from the first fixed abutment 13 and, as a result, axial movement of the first half 9*a* of the supporting element 9.

The speed for pulling out the supporting element 9 can be easily controlled both in the event of a manual operation and where a drill or other suitable power tool of the adjustable-speed type is used.

Simultaneously, the action of the tie-rods 24 interconnecting the first and second fixed abutments 13, 17 enables the axial ejection thrust induced on the supporting element 9 by effect of the elastic shrinkage of sleeve 8 to be counteracted, as previously described. In this way, there is no risk that pulling out of the supporting element 9 should occur at an uncontrolled speed and in particular at a higher speed than that according to which the elastic shrinkage of sleeve 8 brings the latter to progressively exert pressure along the splicing region between cables 2*a*, 2*b*. Thus a suitable and progressive pressure of the tubular sleeve 8 against the outer surfaces of cables 2*a*, 2*b* at the splicing region is, ensured, thereby avoiding formation of undesirable air pockets.

When removal of the first half 9*a* of the supporting element 9 has been completed, the kinematic driving unit 28 is operatively coupled with the second threaded bars 19 to cause pulling out of the second half 9*b* of the supporting element 9 in the same manner as previously described with reference to the first half 9*a*.

Alternatively, removal of the first and second halves 9a, 9b can be carried out simultaneously, by acting on two kinematic driving units 28 coupled with the first and second threaded bars 19, respectively.

In the embodiment in FIG. 6, apparatus 101 is such arranged that rotation of the tie-rods 24 (and the nut screws integral therewith) causes an axial movement of the first and second threaded bars 15, 19. Rotation of the tie-rods 24 can be carried out either manually or with the aid of manual or possibly power-driven tools adapted to be operatively coupled with the tie-rods 24 by means of a suitable kinematic driving unit (not shown). In order that rotation of each tie-rod 24 may cause simultaneous movement of the first and second movable abutments 14, 18 in axially opposite directions, the first and second threaded bars 15, 19, as well as the respective nut screws 16, 20, are preferably provided to have respectively opposite threads, i.e. right-hand and left-hand threads, respectively.

The embodiment shown in FIG. 7 contemplates use of a unitary supporting element 9. In this case the apparatus 102 comprises one movable abutment alone 14, for engagement with one of the ends of the supporting element 9 to cause removal of same from sleeve 8 upon command of the first threaded bars 15 alone that are moved by rotation of the tie-rods 24 with which the respective nut screws 16 are associated. In accordance with the embodiment shown in FIG. 7, also provided, in the same manner as in the embodiments described with reference to FIGS. 1 to 5 and FIG. 6 respectively, is a first fixed abutment 13 and a second fixed abutment 17, the latter acting against the corresponding end 8b of the tubular sleeve 8 to counteract the axial ejection action induced on the supporting element 9 by effect of the elastic shrinkage of sleeve 8.

In order to obtain a suitable axial translation travel of the movable abutment 14, the first threaded bars 15 have a longitudinal extension substantially corresponding to, or exceeding that of the supporting element 9, in contrast to what provided in the examples referred to in FIGS. 1 to 6 where each of the first and second threaded bars 15, 19 has at least the same axial extension as, or an extension substantially corresponding to that of each half 9a, 9b of the supporting element 9.

When the pulling out operation has been completed, the apparatus 100, 101, 102 is dismantled to be removed from cables 2a, 2b and used again for carrying out a new splicing. In a manner known by itself, the supporting element 9, once ejected, can be removed from cables 2a, 2b, following cutting or breakage of the supporting element itself, for example.

The invention claimed is:

1. An apparatus for applying an elastic tubular sleeve onto a splicing region between at least one pair of cables, wherein the tubular sleeve is supported in a radially expanded condition on at least one supporting element, the apparatus comprising:
   axial-movement devices comprising at least one first abutment configured to operatively engage the tubular sleeve and at least one second abutment configured to operatively engage the at least one supporting element, the axial-movement devices being configured to axially move the at least one supporting element relative to the tubular sleeve at an adjustable speed, so as to cause a radial elastic shrinkage of the tubular sleeve capable of inducing an axial ejection thrust on the at least one supporting element; and
   counter devices configured to counteract the axial ejection thrust induced by the elastic shrinkage of the tubular sleeve.

2. The apparatus of claim 1, wherein the axial-movement devices are further configured to apply a pulling action to the at least one supporting element.

3. The apparatus of claim 1, wherein the axial-movement devices are further configured to apply a pulling action on a first end of the at least one supporting element axially projecting from the tubular sleeve.

4. The apparatus of claim 3, wherein the axial-movement devices are further configured to exert, simultaneously with the pulling action, a corresponding counter action on the tubular sleeve.

5. The apparatus of claim 4, wherein the tubular sleeve has a first end close to the First earl of the at least one supporting element,
   wherein the tubular sleeve has a second end spaced apart from the first end of the at least one supporting element, and
   wherein the axial-movement devices are further configured to exert the counter action on the first end of the tubular sleeve.

6. The apparatus of claim 1, wherein the counter devices are further configured to transmit an axial reaction force to a first end of the at least one supporting element axially projecting from the tubular sleeve.

7. The apparatus of claim 6, wherein the counter devices are further configured to carry out, simultaneously with the axial reaction force, a corresponding counter reaction on the tubular sleeve.

8. The apparatus of claim 7, wherein the tubular sleeve has a first end close to the first end of the at least one supporting element,
   wherein the tubular sleeve has a second end spaced apart from the first end of the at least one supporting element,
   wherein the counter devices are further configured to exert the axial reaction force on the first end of the at least one supporting element, and
   wherein the counter devices are further configured to exert the counter reaction in an axial direction against the second end of the tubular sleeve.

9. The apparatus of claim 1, wherein the axial-movement devices further comprise:
   at least one first threaded bar configured to engage one of the at least one first abutment and the at least one second abutment and axially fastened thereto, and co-operating by screwing in at least one first nut screw carried by the other of the at least one first abutment and the at least one second abutment in order to cause axial movement of the at least one second abutment relative to the at least one first abutment following relative rotation between the at least one first threaded bar and the at least one first nut screw;
   wherein the least one first abutment is fixed, and
   wherein the least one second abutment is movable.

10. The apparatus of claim 9, wherein the axial-movement devices further comprise:
    at least one pair of first threaded bars and at least one pair of respective first nut screws set at diametrically opposite positions.

11. The apparatus of claim 10, wherein the axial-movement devices further comprise:
    at least one drive carried by at least one of the at least one first threaded bar and first nut screw.

12. The apparatus of claim 11, wherein the at least one drive is configured to be operatively coupled with a motor for carrying out the relative rotation.

13. The apparatus of claim 11, wherein the axial-movement devices further comprise:
at least one kinematic driving unit drivable through a primary drive and configured to be operatively connected to the primary drive.

14. The apparatus of claim 13, wherein the at least one kinematic driving unit is configured to engage the at least one pair of first threaded bars to simultaneously carry out the relative rotation between the at least one pair of first threaded bars and the at least one pair of respective first nut screws.

15. The apparatus of claim 13, wherein the at least one kinematic driving unit comprises:
a plurality of cogwheels rotatably engaged between two holding plates.

16. The apparatus of claim 9, wherein the counter devices corn wise:
at least one second fixed abutment acting on the tubular sleeve at an axially opposite position relative to the at least one first fixed abutment; and
at least one tie-rod extending from the at least one first fixed abutment to the at least one second fixed abutment.

17. The apparatus of claim 16, wherein the at least one first threaded bar longitudinally extends within the at least one tie-rod.

18. The apparatus of claim 16, further comprising:
at least one axial-locking bush to engage the at least one first nut screw with a respective end of the at least one tie-rod.

19. The apparatus of claim 18, wherein the at least one axial-locking bush comprises:
two circumferential ridges configured to engage circumferential grooves formed in the at least one first nut screw and the respective end of the at least one tie-rod.

20. The apparatus of claim 18, wherein the at least one axial-locking bush comprises:
a pair of shell halves configured to couple at diametrically opposite sides; and
a holding ring nut configured to fit by axial sliding around the coupled pair of shell halves.

21. The apparatus of claim 9, wherein the axial-movement devices further comprise:
at least one second fixed abutment acting on the tubular sleeve at an axially opposite position relative to the at least one first fixed abutment;
at least one second movable abutment configured to engage the at least one supporting element at an axially opposite position relative to the at least one first movable abutment, and
at least one second threaded bar connected and axially fastened to one of the at least one second fixed abutment and the at least one second movable abutment, and co-operating by screwing in at least one second nut screw carried by the other of the at least one second fixed abutment and the at least one second movable abutment in order to cause axial movement of the at least one second movable abutment relative to the at least one second fixed abutment following relative rotation between the at least one second threaded bar and the at least one second nut screw.

22. The apparatus of claim 21, wherein the axial-movement devices further comprise:
a pair of second threaded bars and a pair of second nut screws set at diametrically opposite positions.

23. The apparatus of claim 21, wherein the at least one second threaded bar extends longitudinally within at least one tie-rod extending from the at least one first fixed abutment to the at least one second axed abutment.

24. The apparatus of claim 21, wherein at least one of the at least one first fixed abutment, first movable abutment, second fixed abutment, and second movable abutment has a plate conformation with a central through opening configured to be positioned around the at least one supporting element.

25. The apparatus of claim 24, wherein the central through opening has a smaller diameter than an outer diameter of the tubular sleeve.

26. The apparatus of claim 24, wherein at least one of the at least one first fixed abutment, first movable abutment, second fixed abutment, and second movable abutment further has at least one engagement seat configured to be operatively coupled with a respective threaded bar.

27. The apparatus of claim 26, wherein at least one of the at least one first fixed abutment, first movable abutment, second fixed abutment, and second movable abutment comprises a pair of half-plates configured to be coupled in coplanar relationship along a splicing line passing through the central through opening and the at least one engagement seat.

28. The apparatus of claim 21, wherein at least one of the at least one first nut screw and second nut screw is integral with a respective end of at least one tie-rod extending from the at least one first fixed abutment to the at least one second fixed abutment.

29. The apparatus of claim 28, wherein the at least one tie-rod is drivable in rotation to carry out the relative rotation.

30. An apparatus for splicing at least one pair of cables, each cable including at least one conductor, the apparatus comprising:
at least one removable supporting element;
an elastic tubular sleeve supported in a radially expanded condition on the at least one removable supporting element;
axial-movement devices comprising at least one first abutment configured to operatively engage the tubular sleeve and at least one second abutment configured to operatively en age the at least one removable supporting element in order to axially move at least one portion of the at least one removable supporting element relative to the tubular sleeve at an adjustable speed, so as to give rise to a radial elastic shrinkage of the tubular sleeve capable of inducing an axial ejection thrust on the at least one removable supporting element; and
counter devices configured to counteract the axial ejection thrust induced by the elastic shrinkage of the tubular sleeve.

* * * * *